No. 795,036. PATENTED JULY 18, 1905.
A. L. HERKENHOFF.
POWER TRANSMITTING MECHANISM.
APPLICATION FILED JUNE 11, 1904.
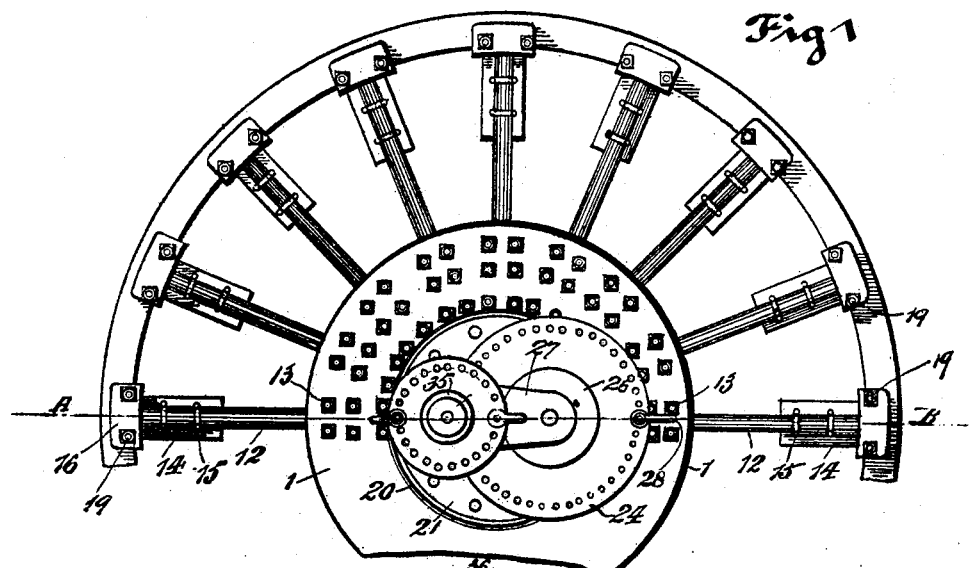
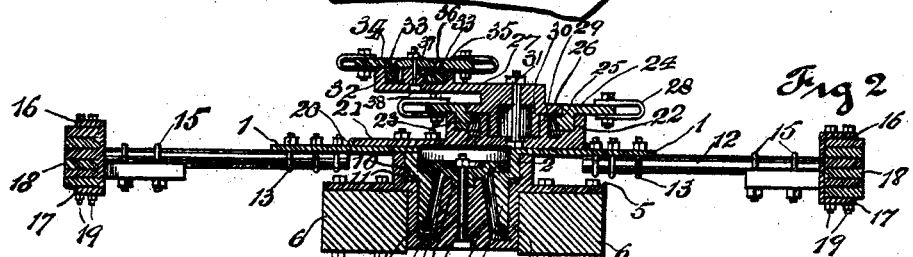
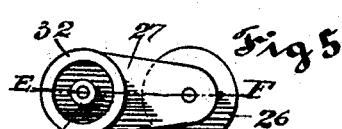
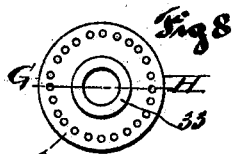
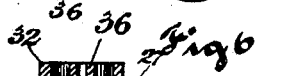
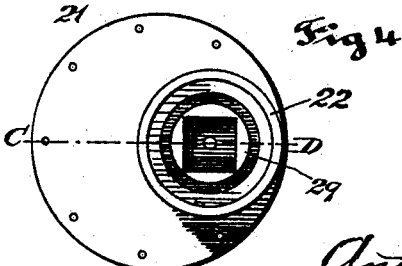
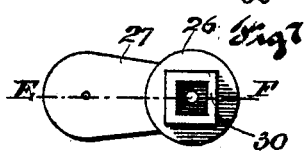
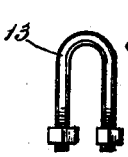

No. 795,036. Patented July 18, 1905.

UNITED STATES PATENT OFFICE.

ANTHONY L. HERKENHOFF, OF MINSTER, OHIO.

POWER-TRANSMITTING MECHANISM.

SPECIFICATION forming part of Letters Patent No. 795,036, dated July 18, 1905.

Application filed June 11, 1904. Serial No. 212,212.

*To all whom it may concern:*

Be it known that I, ANTHONY L. HERKENHOFF, a citizen of the United States, residing at Minster, in the county of Auglaize and State of Ohio, have invented certain new and useful Improvements in Power-Transmitting Mechanism, of which the following is a specification, reference being had therein to the accompanying drawings.

My invention relates to power-transmitting means whereby a series of oil-well pumps situated in different locations relatively to the said means and in different directions therefrom may be operated simultaneously, as hereinafter described, and particularly pointed out in the claims.

The chief object of this invention is to provide a band wheel or pulley power transmission on which is mounted a means for imparting a reciprocating motion to oil-well pumps or other such mechanism situated in different positions around said power-transmitting pulley, and which reciprocating means is so arranged that the power or resistance of the oil-well pumps situated at one side of the power-transmitting pulley will counteract or balance the resistance of the oil-well pumps or other mechanism situated on the opposing or opposite side of the power-transmitting pulley; also, to construct such power-transmitting-pulley mechanism in such a manner that the frictional resistance of the same will be reduced to a minimum; also, to construct such power-transmitting pulley that the number of the parts constituting the said pulley will be reduced to a minimum and to proportion such parts that the weight of the pulley may be reduced and the construction simplified. I attain these objects by means of the pulley illustrated in the accompanying drawings, in which similar numerals of reference designate like parts throughout the several views.

Figure 1 is a broken half-plan view of the pulley. Fig. 2 is a sectional elevational view of the same, taken through the line A B. (See Fig. 1.) Fig. 3 is a detail sectional view of the main eccentric plate, taken through the line C D. (See Fig. 4.) Fig. 4 is a plan view of the same. Fig. 5 is a detail plan view of the crank of the secondary eccentric-crank. Fig. 6 is a detail sectional view of the same, taken through the line E F. (See Figs. 5 and 7.) Fig. 7 is an inverted plan view of the same. Fig. 8 is a detail plan view of the secondary eccentric disk. Fig. 9 is a detail sectional view of the same, taken through the line G H, (see Fig. 8;) and Fig. 10 is an enlarged detail view of a U-form clamping-bolt whereby the spokes of the pulley are held in position.

The power-transmitting pulley comprises a main plate 1, on the under side of which projects a sleeve or hollow journal composed of an upper enlarged portion 2 and a lower reduced portion 3, and the said sleeve-journal is adapted to fit and to turn in its bearing-sleeve 4. The bearing-sleeve 4 is formed integral on the bed-plate 5, which latter is securely bolted to the timbers 6. The bottom of the sleeve-bearing 4 is closed, and integral on said bottom and centrally therewith is formed the post 7, which projects upwardly within said bearing-sleeve, and on the end of said post 7 rests and is secured the retaining-plate 8, which is securely bolted to said post by the retaining-bolt 9. The retaining-plate 8 is of slightly less diameter than the bore of the enlarged sleeve portion 2 of the sleeve-journal, and said plate has its trued lower surface adapted to bear against the trued bearing-surface of the lip or shoulder 10 of said sleeve-journal to retain the latter securely in position in its bearing 4.

A bearing-ring 11 is introduced between the lip or shoulder 10 of the enlarged portion 2 and the bearing-shoulder of the bearing 4, and the same is provided for the purpose of forming a friction-ring, whereby the friction and the wear of the shoulder of the sleeve 2 on the bearing 4 will be materially reduced. The said ring is preferably constructed of a softer metal, as brass.

The spokes 12 of the pulley are preferably constructed of gas-pipe or other suitable light tubing, and the said spokes are securely bolted to the center of the main plate 1 by U-form clamping-bolts 13. On the ends of the said pipes are similarly secured the rim-supporting brackets 14 by U-form bolts 15, which bolts are similar in every respect to the U-form bolts 13. Integral on the said brackets are formed the upper and lower rim-supporting jaws 16 and 17, between which the rim 18 of the pulley is fitted and secured by suitable securing-bolts 19. The rim 18 of the pulley is preferably composed of a series of laminated segments of wood properly fitted and glued or otherwise secured together and turned truly to a regular peripheral surface concentric with the axis of the pulley.

On the upper surface of the main plate 1 is formed the concentric flange 20, in which is fitted the main eccentric plate 21, which latter is securely bolted to the main plate 1. The primary or main eccentric sleeve 22 is formed integral on the plate 21 and is situated in position on said plate 21 to give the required degree of eccentricity to impart the required reciprocal movement to the mechanisms connected thereto, and the same is truly bored to receive the bearing-sleeve 23 of the primary or main power-transmitting plate 24. The top surface of the main power-transmitting plate 24 (see Figs. 1 and 2) is counterbored to form a bearing-shoulder 25, against which the collar 26 of the crank 27 bears, to retain said main power-transmitting plate 24 in position in its eccentric bearing-sleeve 22. A series of pin-holes are arranged around the peripheral edge of the main power-transmitting plate 24, which are provided for the purpose of connecting one or more clevises 28 in any position on said plate. Projecting upwardly within the main eccentric plate 22 is the socket 29, which is provided with a square bore, in which is fitted the square stem 30 of the crank 27, and the said stem 30 is held in position in said socket 29 (see Figs. 1 and 2) and firmly secured therein by the securing-bolt 31. The length of the crank is such that when the same is placed in position, as shown in Figs. 1 and 2, the eccentric sleeve 32 thereof will be situated on the side of the main plate 1 diametrically opposite the main or primary eccentric sleeve 22 and will have the same eccentricity as the latter.

On the end of the crank 27 is formed the secondary eccentric sleeve 32, which is bored to receive the secondary bearing-sleeve 33 of the secondary eccentric 34. The secondary eccentric plate 34 is counterbored on its top surface to form bearing-lips 35, and integral on the bottom closed portion of the sleeve 32 is formed the upwardly-projecting stem 36, on the end of which is secured the retaining-washer 37, which latter is firmly secured to said stem 36 by the securing-bolt 38. The under peripheral edge of the washer 37 bears against the lips 35 of the main plate 34 to retain the same in position. A series of holes are arranged around the peripheral edge of the secondary eccentric plate 34, similar to that of the primary or main eccentric plate, which are provided for the purpose of connecting one or more clevises in any position on said plate.

It will be observed that the secondary eccentric is situated in a direction directly opposite to the main eccentric and that the eccentricity of the secondary eccentric is equal to that of the main eccentric, so that power simultaneously transmitted by both eccentrics will be opposite and balanced, thereby equalizing resistance applied to the main power of the pulley and avoiding any undue side stress to be applied to the main bearing 4 of the pulley, thus reducing the frictional resistance of the mechanism, and thereby causing a uniform and regular wearing of the bearings and reducing the tendency of the same to wear out of true. It will also be particularly noted that naturally the bearing-sleeve 4 is closed at its bottom end to form a reservoir in which to store a lubricant, but the bearing-sleeves 22 and 32 of the primary or main and secondary eccentrics are also closed at their bottom ends for the same purpose and object as the main bearing.

The retaining-plate 8 is preferably constructed with a depending square portion 39, which fits into a similar recess formed in the top end of the post 7, and the said square portion is provided for the purpose of preventing the said retaining-plate 8 from rotating, thereby loosening the securing-bolt 9. By this means a more rigid and permanent construction is obtained.

Having thus fully described this my invention, what I claim as new and useful, and desire to cover by Letters Patent of the United States therefor, is—

1. In a power-transmitting mechanism, the combination with a power-transmitting pulley, an eccentric carrying-plate situated concentrically on said pulley, a bearing-sleeve situated eccentrically on said plate, a power-transmitting plate and a bearing-sleeve depending from the under side thereof, of a square socket formed integral with and extending vertically and centrally within said eccentric sleeve, a square stem adapted to fit in said socket, a bearing-collar on the upper end of said stem, and means for securing said stem in said socket to retain said power-transmitting plate in position.

2. In a power-transmitting mechanism, the combination with a power-transmitting pulley, an eccentric carrying-plate situated concentrically on said pulley, a bearing-sleeve situated eccentrically on said plate, a primary power-transmitting plate, a bearing-sleeve depending from the under side thereof, and a square socket formed integral with and extending vertically and centrally within said eccentric sleeve, of a crank, a square stem formed on one end of said crank and an upwardly-extending eccentric sleeve formed on its opposite end, a secondary power-transmitting plate and a bearing-sleeve depending from the under side thereof, a square secondary socket formed integral with and centrally within said secondary eccentric sleeve, a secondary square stem, a collar formed on the upper end of said secondary stem, and means for securing the same in said socket.

In testimony whereof I affix my signature in presence of two witnesses.

ANTHONY L. HERKENHOFF.

Witnesses:
  JOHN LAUFERSWEILER,
  JOSEPH H. LAUFERSWEILER.